United States Patent Office 3,322,852
Patented May 30, 1967

3,322,852
POLYBLENDS CONTAINING A GRAFT COPOLYMER OF HYDROXYLATED DIENE RUBBER, A COPOLYMER CONTAINING A MONOETHYLENICALLY UNSATURATED CARBOXYLIC ACID WITH ACRYLONITRILE, AND A POLYEPOXIDE
Quirino A. Trementozzi, Springfield, Mass., Stanley E. Gebura, Overland Park, Kans., and Frederic J. Locke, East Longmeadow, Mass., assignors to Monsanto Company, St. Louis, Mo., a corporation of Delaware
No Drawing. Filed June 19, 1964, Ser. No. 376,562
13 Claims. (Cl. 260—837)

This invention relates to polyblends and more particularly to polyblends of (a) acid interpolymers, (b) graft copolymers comprising a diene rubber substrate polymer and a hydroxylic superstrate polymer and (c) epoxy resins.

An object of this invention is to provide novel polyblends.

Another object is the provision of a novel class of polyblends of acid interpolymers with graft copolymers containing hydroxyl groups and epoxy resins.

A further object is the provision of methods for preparing such polyblends.

These and other objects are attained through the provision of blends comprising:

(A) a graft copolymer comprising a diene rubber substrate polymer and a hydroxylic superstrate polymer in proportion of about 15 to 200 parts by weight of superstrate polymer per 100 parts by weight of substrate polymer, (B) an acid interpolymer comprising at least one acid monomer as hereinafter set forth interpolymerized with a nitrile monomer as hereinafter set forth and at least one vinylidene monomer interpolymerizable with said monomer and said nitrile monomer, and (C) an epoxy compound containing a plurality of epoxy groups.

The following examples are presented in illustration of the invention and are not intended as limitations thereon. Where parts are mentioned, they are parts by weight unless otherwise specified.

EXAMPLE I (PREPARATION OF GRAFT COPOLYMER LATICES)

Part A

Prepare a series of Diene Rubber Substrate Polymer Latices, A–Q, according to the following polymerization recipe:

| Component: | Parts |
|---|---|
| Water | 250 |
| Diene | X |
| Comonomer(s) | Y |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to polymer. The nature and amount of the diene rubber and the comonomer(s) in each instance are shown in Table A, infra.

Part B

Prepare a series of graft copolymer latices, A–Q, by adding varying amounts of ethylenically unsaturated alcohol and optional comonomer(s), together with 0.2 parts of t-dodecyl mercaptan, to aliquots of Diene Rubber Substrate Polymer Latices, A–Q, prepared in Part A hereof, containing 100 parts of rubber solids and heating the reaction mixture at 70° C. with agitation until substantially all of the monomer mixture has polymerized. Stabilize each of the latices by adding 2 parts of a styrenated phenol antioxidant thereto. The nature and amount of the ethylenically unsaturated alcohol and the comonomer(s) in each instance are shown in Table A, infra. The graft copolymers in each instance are comprised of a diene/optional comonomer substrate with an ethylenically unsaturated alcohol/optional comonomer superstrate grafted thereto in the designated proportions.

Part C

Each of the graft copolymer latices, A–Q, are precipitated in an excess of methanol and the solids are recovered by filtration. The solids are then dispersed in a proportion of methyl ethyl ketone calculated to provide approximately 15% solids by weight dispersions.

TABLE A.—HYDROXYLATED GRAFT COPOLYMERS

| Graft Copolymer Latex | A—Diene Rubber Substrate Polymer | | | | B—Hydroxylic Superstrate Polymer | | | | Parts B per 100 Parts A |
|---|---|---|---|---|---|---|---|---|---|
| | Diene | Parts X | Comonomer(s) | Parts Y | Ethylenically Unsaturated Alcohol | Parts | Comonomer(s) | Parts | |
| I-A | Butadiene | 100 | None | | Vinylbenzyl alcohol | 10 | Styrene/Acrylonitrile | 80/10 | 60 |
| I-B | do | 90 | Styrene | 10 | do | 10 | do | 80/10 | 60 |
| I-C | do | 90 | do | 10 | do | 10 | do | 70/20 | 60 |
| I-D | do | 90 | do | 10 | Phenylallyl alcohol | 10 | do | 70/20 | 60 |
| I-E | do | 90 | do | 10 | do | 20 | do | 60/20 | 60 |
| I-F | do | 75 | Styrene/Vinylbenzyl alcohol | 10/15 | Vinylbenzyl alcohol | 10 | do | 70/20 | 60 |
| I-G | do | 75 | Styrene/Phenylallyl alcohol | 10/15 | Phenylallyl alcohol | 10 | do | 70/20 | 60 |
| I-H | do | 80 | Phenylallyl alcohol | 20 | do | 10 | do | 70/20 | 50 |
| I-I | do | 90 | Styrene | 10 | Vinylbenzyl alcohol | 20 | Styrene | 80 | 60 |
| I-J | do | 100 | None | | Phenylallyl alcohol | 100 | None | | 35 |
| I-K | Isoprene | 75 | Styrene | 25 | 2-hydroxymethyl butadiene | 100 | do | | 90 |
| I-L | Butadiene | 90 | do | 10 | Ethyl betahydroxyethyl fumarate | 20 | Vinyl chloride | 80 | 50 |
| I-M | do | 90 | do | 10 | Bis-(betahydroxyethyl)fumarate | 25 | Methyl methacrylate | 75 | 30 |
| I-N | do | 90 | do | 10 | Betahydroxyethyl acrylate | 10 | Ethyl acrylate | 90 | 60 |
| I-O | do | 90 | do | 10 | Ethyl betahydroxyethyl fumarate | 77 | Butene-1 | 23 | 30 |
| I-P | do | 90 | do | 10 | Phenylallyl alcohol | 25 | Butadiene | 75 | 40 |
| I-Q | do | 80 | Styrene/Vinylbenzyl alcohol | 10/10 | Vinylbenzyl alcohol | 25 | do | 75 | 50 |

EXAMPLE II

Part A (Preparation of a styrene/acrylonitrile/acrylic acid interpolymer)

A solution of 210 parts styrene monomer, 66 parts acrylonitrile monomer, 24 parts acrylic acid monomer, 80 parts xylene, 70 parts n-butyl acetate, 3 parts benzoyl peroxide and 2.5 parts di-t-butyl peroxide is prepared. Twenty-five parts of this solution is charged to a reactor fitted with a reflux condenser and a dropping funnel. The reaction mixture is heated to reflux temperature (about 120° C.) and, after reflux is initiated, the balance of the solution is added to the reactor at a constant rate over a period of 2.5 hours. Reflux is continued thereafter for a period of 20 minutes. The resulting solution is cooled to room temperature and diluted with 46 parts xylene and 43 parts of n-butanol to provide a resin solution containing about 40% resin solids.

Part B (Preparation of other acid interpolymers)

A series of additional acid interpolymers are prepared following the general procedure described in Part A of this Example II. The composition of the monomer charge is set forth in Table B, infra.

EXAMPLE III (PREPARATION OF POLYBLENDS)

Part A

A series of acid interpolymer/epoxy compound mixtures are prepared by dissolving 100 parts of each of the acid interpolymers prepared in Example II and listed in Table B, supra, a variable proportion (shown in Table C, infra) of Epon 828 (essentially the diglycidyl ether of bis-phenol A), and 0.25 part of dodecyl trimethyl ammonium chloride in 85 parts of methyl ethyl ketone.

Part B

A series of polyblends are prepared by mixing 220 parts (ca. 100 parts of acid interpolymer solids) of the solution prepared in Part A of this Example III and a variable proportion (shown in Table C, infra) of the hydroxylated graft copolymer solution prepared in Part C of Example I. All compositions are shown in Table C, infra.

TABLE B.—ACID INTERPOLYMERS

| Example | Acid Monomer | | Nitrile Monomer | | Vinylidene Monomer | |
|---|---|---|---|---|---|---|
| | Component | Parts | Component | Parts | Component | Parts |
| II-A | Acrylic Acid | 24 | Acrylonitrile | 66 | Styrene | 210 |
| II-B (1) | do | 4 | do | 11 | Methyl Methacrylate | 85 |
| II-B (2) | do | 15 | do | 35 | Styrene | 50 |
| II-B (3) | do | 20 | do | 20 | do | 60 |
| II-B (4) | do | 10 | Methacrylonitrile | 20 | do | 70 |
| II-B (5) | Methacrylic Acid | 10 | Acrylonitrile | 10 | Vinyl Chloride | 80 |
| II-B (6) | Chloracrylic Acid | 15 | do | 15 | Vinyl Acetate | 70 |
| II-B (7) | Acrylic Acid | 10 | do | 20 | do | 70 |
| II-B (8) | do | 20 | do | 20 | Vinyl Chloride | 60 |

TABLE C

| Example | Hydroxylated Graft Copolymer | | | | Acid Interpolymer | | | Epon 828 (Parts) |
|---|---|---|---|---|---|---|---|---|
| | of Ex. | Parts | Substrate | Superstrate | of Ex. | Parts | Composition | |
| III-A | I-A | 8 | 100 Butadiene | 10 Vinylbenzyl Alcohol, 80 Styrene, 10 Acrylonitrile. | 60 | II-A | 100 | 70 Styrene, 22 Acrylonitrile, 8 Acrylic Acid. | 36 |
| III-B | I-B | 8 | 90 Butadiene, 10 Styrene. | do | 60 | II-B (3) | 100 | 60 Styrene, 20 Acrylonitrile, 20 Acrylic Acid. | 36 |
| III-C | I-C | 4 | do | 10 Vinylbenzyl Alcohol, 70 Styrene, 20 Acrylonitrile. | 60 | II-A | 100 | 70 Styrene, 22 Acrylonitrile, 8 Acrylic Acid. | 36 |
| III-D | I-D | 8 | do | 10 Phenylallyl Alcohol, 70 Styrene, 20 Acrylonitrile. | 60 | II-A | 100 | do | 36 |
| III-E | I-E | 8 | do | 20 Phenylallyl Alcohol, 60 Styrene, 20 Acrylonitrile. | 60 | II-B (3) | 100 | 60 Styrene, 20 Acrylonitrile, 20 Acrylic Acid. | 36 |
| III-F | I-F | 200 | 75 Butadiene, 10 Styrene, 15 Vinylbenzyl Alcohol. | 10 Vinylbenzyl Alcohol, 70 Styrene, 20 Acrylonitrile. | 60 | II-B (1) | 100 | 85 Methyl Methacrylate, 11 Acrylonitrile, 4 Acrylic Acid. | 60 |
| III-G | I-G | 50 | 75 Butadiene, 10 Styrene, 15 Phenylallyl Alcohol. | 10 Phenylallyl Alcohol, 70 Styrene, 20 Acrylonitrile. | 60 | II-B (7) | 100 | 70 Vinyl Acetate, 20 Acrylonitrile, 10 Acrylic Acid. | 36 |
| III-H | I-H | 25 | 80 Butadiene, 20 Phenylallyl Alcohol. | 10 Phenylallyl Alcohol, 70 Styrene, 10 Acrylonitrile. | 50 | II-B (2) | 100 | 50 Styrene, 35 Acrylonitrile, 15 Acrylic Acid. | 42 |
| III-I | I-I | 100 | 90 Butadiene, 10 Styrene. | 20 Vinylbenzyl Alcohol, 80 Styrene. | 60 | II-B (4) | 100 | 70 Styrene, 20 Methacrylonitrile, 10 Acrylic Acid. | 38 |
| III-J | I-J | 20 | 100 Butadiene | 100 Phenylallyl Alcohol | 35 | II-B (3) | 100 | 60 Styrene, 20 Acrylonitrile, 20 Acrylic Acid. | 43 |
| III-K | I-K | 10 | 75 Isoprene, 25 Styrene. | 100 2-hydroxymethyl Butadiene. | 90 | II-B (5) | 100 | 80 Vinyl Chloride, 10 Acrylonitrile, 10 Methacrylic Acid. | 50 |
| III-L | I-L | 25 | 90 Butadiene, 10 Styrene. | 20 Ethyl Betahydroxyethyl Fumarate, 80 Vinyl Chloride. | 50 | II-B (6) | 100 | 70 Vinyl Acetate, 15 Acrylonitrile, 15 Chloracrylic Acid. | 36 |
| III-M | I-M | 10 | do | 25 Bis-(betahydroxyethyl(Fumarate, 75 Methyl Methacrylate. | 30 | II-B (8) | 100 | 60 Vinyl Chloride, 20 Acrylonitrile, 20 Acrylic Acid. | 118 |
| III-N | I-N | 10 | do | 10 Betahydroxyethylacrylate, 90 Ethyl Acrylate. | 60 | II-B (7) | 100 | 70 Vinyl Acetate, 20 Acrylonitrile, 10 Acrylic Acid. | 4, 5 |

TABLE C—Continued

| Example | Hydroxylated Graft Copolymer | | | | Acid Interpolymer | | | Epon 828 (Parts) |
|---|---|---|---|---|---|---|---|---|
| | of Ex. | Parts | Substrate | Superstrate | of Ex. | Parts | Composition | |
| III-O | I-O | 10 | 90 Butadiene, 10 Styrene. | 100 77 Ethyl Betahydroxyethyl Fumarate, 23 Butene-1. | 30 II-A | 100 | 70 Styrene, 22 Acrylonitrile, 8 Acrylic Acid. | 54 |
| III-P | I-P | 10 | ___do___ | 100 25 Phenylallyl Alcohol, 75 Butadiene. | 40 II-A | 100 | ___do___ | 18 |
| III-Q | I-Q | 10 | 80 Butadiene, 10 Styrene, 10 Vinylbenzyl Alcohol. | 100 25 Vinylbenzyl Alcohol, 75 Butadiene. | 50 II-B (2) | 100 | 50 Styrene, 35 Acrylonitrile, 15 Acrylic Acid. | 9 |

EXAMPLE IV (PREPARATION OF GLASS LAMINATES)

The polyblends prepared in Examples IIIA–IIIQ are fabricated into multi-ply laminates and tested for bond strength. All resinous polyblends are adjusted to 62% solids by weight with methyl ethyl ketone. In each instance a glass cloth (Hess Goldsmith style 28 with a Volan A finish) measuring 10 inches by 38 inches is rolled into a cylinder and immersed in the resinous solution for 30 minutes. The cloth is removed and drawn between stainless steel rolls set for a 12 mil gap. The cloth is dried at 125° C. for 5 minutes in a forced hot air oven to drive off solvent. Each cloth is then cut into 3 inch diameter disks and assembled into an 80 ply laminate preform which is then pressed between chrome plated steel platens at 160° C. and 1000 p.s.i. for 1 hour and then cooled under pressure. In each instance the glass laminate prepared from a polyblend of this invention evidences a stronger bond between adjacent plies than does a laminate prepared using an equal solids content of the acid interpolymer and epoxy resin mixture used without the hydroxylated graft copolymer.

Hydroxylated graft copolymers

The hydroxylated graft copolymers of this invention are prepared by polymerizing from about 15 to 200 parts by weight of superstrate monomer in an aqueous dispersion containing 100 parts by weight of the diene rubber polymer which will form the substrate of the hydroxylated graft copolymer. The aforesaid superstate monomer comprises an ethylenically unsaturated alcohol in optional admixture with one or more copolymerizable ethylenically unsaturated monomers, one of which may be a nitrile monomer, in proportions of from about 1 to 100% by weight of the ethylenically unsaturated alcohol, from zero to about 60% by weight of the ethylenically unsaturated nitrile, and from zero to about 95% by weight of other copolymerizable ethylenically unsaturated monomers. The preferred hydroxylated graft copolymers are those prepared by polymerizing from about 20 to 90 parts, and particularly 40 to 80 parts, of superstrate monomer(s) per 100 parts of diene rubber polymer.

The graft copolymerization reaction is conducted with agitation at a temperature at which the initiator in the system initiates copolymerization of the superstrate monomer(s), usually a temperature of 40–100° C. Supplementary polymerization initiator may be added to the system to insure substantially complete conversion of the monomer charge to polymer, but this supplementary initiator is frequently unnecessary because of the ability of unconsumed initiator remaining from the preparation of the diene rubber polymer and/or active sites on the chain of the diene rubber polymer to initiate polymerization of the monomer charge.

The reaction is preferably conducted in the substantial absence of any emulsifying agent added to the preformed diene rubber polymer latex because of the effect of added emulsifying agent in decreasing grafting efficiency. The emulsifying agent already present in the diene rubber polymer latex is usually sufficient to act as a dispersing agent for the graft copolymerization reaction. If desired, however, up to about 2% of emulsifying agent, based on the weight of the superstrate monomer mixture, can be added to the aqueous dispersion. The observance of this precaution with regard to added emulsifying agent permits the attainment of high grafting efficiency. As a result, the graft copolylmers generally have at least 80% of the superstrate chemically-combined with the substrate. Since no unreacted rubber can be extracted from the graft copolymer, it appears that all of the diene rubber polymer becomes chemically-combined with the superstrate.

Optional additives, such as chain transfer agents and stabilizers, can be included in the graft copolymerization reaction mixture when desired.

Hydroxylated graft copolymer superstrate

The superstrate of the hydroxylated graft copolymer comprises (a) from about 1 to 100%, and preferably from about 5 to 25%, by weight of a chemically-combined ethylenically unsaturated alcohol, (b) from zero to about 60%, preferably from zero to about 30%, by weight of a chemically-combined ethylenically unsaturated nitrile and (c) from zero to about 95%, and preferably from about 40 to 90%, by weight of other chemically-combined copolymerizable ethylenically unsaturated monomer(s).

The ethylenically unsaturated alcohols suitable for use are ethylenically unsaturated mono- and poly-hydroxylic monomers. If desired, other functional groups than hydroxyl may be present in the monomer structure. Thus, these alcohols may be selected from a wide class of materials including aromatic alcohols such as, e.g., vinyl benzyl alcohol, 2-phenyl allyl alcohol, vinyl betahydroxyethyl benzene, betahydroxyethyl styrene, etc.; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hydroxymethyl butadiene-1,3, 2,3-bis(hydroxymethyl)butadiene-1,3, etc.; hydroxylic mono- and poly-carboxylic acid esters such as, e.g., ethyl betahydroxyethyl fumarate, bis(betahydroxyethyl)fumarate, betahydroxyethyl acrylate, butyl betahydroxypropyl fumarate, betahdroxypropyl methacrylate, betahydroxypropyl crotonate, bis-(betahydroxyethyl) itaconate, ethyl betahydroxyethyl maleate, alphahydroxymethyl methylacrylate, etc.; hydroxylic mono- and poly-carboxylic acids such as, e.g., alphahydroxymethyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymethyl maleimide, N-betahydroxypropyl maleimide, betahydroxyethyl acrylamide, 2-hydroxymethyl allyl amine, etc.; alphahydroxymethyl acrylonitrile; etc. Various of these alcohols are employed in the examples, but may be replaced, with equivalent results, with any of the other alcohols characterized above, or mixtures thereof.

Ethylenically unsaturated nitriles suitable for use are acrylonitrile, methacrylonitrile, and mixtures thereof.

The copolymerizable ethylenically unsaturated monomer(s) suitable for use are selected from a wide class of vinyl and vinylidene monomers including olefins such as, e.g., ethylene, propylene, isobutylene, 3-methyl butene-1, butene-1, pentene-1, etc., mono- and poly- carboxylic acid esters such as, e.g., methyl methacrylate, ethyl acrylate, diethyl maleate, etc.; mono- and poly-carboxylic acids or anhydrides such as, e.g., acrylic acid, methacrylic acid, crotonic acid, fumaric acid, maleic acid, maleic anhydride, itaconic acid, etc.; vinyl and vinylidene halides such as, e.g., vinyl chloride, vinyl bromide, vinylidene chloride, etc. Particularly preferred are the monovinylidene aromatic compounds such as styrene; and substituted alkyl styrenes such as, e.g., ortho-, meta- and para-methylstyrenes, 2,4-dimethylstyrene, para-ethyl styrene, etc.; aryl substituted halostyrenes such as, e.g., ortho-, meta- and para-chlorostyrenes or bromostyrenes, 2,4-dichlorostyrene, 2-methyl-4-chlorostyrene, etc.; mixtures thereof with one another; and mixtures thereof with alphamethylstyrene. When alphamethylstyrene-containing mixtures are employed, the components should be proportioned such that the alphamethylstyrene does not constitute more than about 70% of the total weight of the superstrate-forming monomers. Various of the ethylenically unsaturated monomers hereinabove defined are employed in the examples, but may be replaced, with equivalent results, with any of the other monomers characterized above, or mixtures thereof.

Graft copolymer substrate

The substrate of the graft copolymer is a diene rubber polymer which comprises, (a) from about 40 to 100%, and preferably from about 75 to 100%, by weight of a chemically-combined conjugated diene and (b) from zero to about 60%, and preferably zero to about 25%, by weight of other chemically-combined ethylenically unsaturated monomer(s).

Conjugated dienes suitable for use are butadiene, isoprene, and mixtures thereof.

The copolymerizable ethylenically unsaturated monomer(s) suitable for use are selected from a wide class of vinyl and vinylidene monomers as defined above in conjunction with the superstrate monomers. In a preferred embodiment, the substrate will comprise the conjugated diene in chemical combination with, as the copolymerizable monomer, an ethylenically unsaturated alcohol or a monovinylidene aromatic compound, both as heretofore defined. In a particularly preferred embodiment, both an ethylenically unsaturated alcohol and a monovinylidene aromatic compound, and especially styrene, will be employed. In this last embodiment, the diene rubber polymer substrate will comprise (a) from about 40 to 99%, and preferably from about 75 to 99%, by weight of the chemically-combined conjugated diene, (b) from about 1 to 60%, and preferably from about 1 to 25%, by weight of the chemically-combined hydroxylic monomer and (c) from about 1 to 60%, and preferably from about 1 to 25%, by weight of the monovinylidene aromatic compound.

This invention is not limited in the manner of manufacture of the diene rubber polymer. The examples show free radical polymerization in aqueous systems but equally satisfactory results are obtained using, e.g., anionic or cationic catalysts in aqueous or organic systems. In this way, diene rubbers may be made from monomer combinations which do not readily polymerize by, e.g., free radical mechanism. Similarly, monomers which do not copolymerize readily with butadiene or isoprene can be used in conjunction with other copolymerizable monomers capable of copolymerization with both to form, e.g., terpolymers.

Thus, in various embodiments the copolymerizable ethylenically unsaturated monomer(s) may be olefins such as, e.g., ethylene, propylene, isobutylene, 3-methyl butene-1, butene-1, pentene-1, etc.; mono- and poly-carboxylic acid esters such as, e.g., methyl methacrylate, ethyl acrylate, diethyl maleate, etc.; mono- and poly-carboxylic acids or anhydrides such as, e.g., acrylic acid, methacrylic acid, crotonic acid, fumaric acid, maleic acid, maleic anhydride, itaconic acid, etc.; vinyl and vinylidene halides such as e.g., vinyl chloride, vinyl bromide, vinylidene chloride, etc;. monovinylidene aromatic compounds such as styrene; aryl substituted alkyl styrenes such as, e.g., ortho-, meta- and para-methylstyrenes, 2,4-dimethylstyrene, para-ethyl styrene, etc.; aryl substituted halostyrnes such as, e.g., ortho-, meta- and para-chlorostyrenes or bromostyrenes, 2,4-dichlorostyrene, 2-methyl-4-chlorostyrene, etc.; aromatic alcohols such as, e.g., vinyl benzyl alcohol, 2-phenyl allyl alcohol, vinyl beta-hydroxyethyl benzene, betahydroxyethyl styrene, etc.; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hydroxymethyl butadiene-1,3, 2,3-bis-(hydroxymethyl)butadiene-1,3, etc.; hydroxylic mono- and poly-carboxylic acid esters such as, e.g., ethyl betahydroxyethyl fumarate, bis-(betahydroxyethyl)fumarate, betahydroxyethyl acrylate, butyl betahydroxypropyl fumarate, betahydroxypropyl methacrylate, betahydroxypropyl crotonate, bis((betahydroxyethyl)itaconate, ethyl betahydroxyethyl maleate, alphahydroxymethyl methacrylate, etc.; hydroxylic mono- and poly-carboxylic acids such as, e.g., alphahydroxymethyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymethyl maleimide, N-betahydroxypropyl maleimide, betahydroxyethyl acrylamide, 2-hydroxymethyl allyl amine, etc.; alphahydroxymethyl acrylonitrile; etc. Various of the ethylenically unsaturated monomers hereinabove defined are employed in the examples, but may be replaced, with equivalent results with any of the other monomers characterized above, or mixtures thereof.

If desired, a chemical cross-linking agent can be used in the preparation of the substrate polymer. Generally, amounts of up to about 5% based on the weight of the rubber-forming monomers is sufficient. Cross-linking agent contents of 0.5-1.25% are particularly advantageous. Any cross-linking agent capable of reacting with the rubber-forming monomers can be used in the practice of the invention. Such cross-linking agents are, of course, already well known and include, e.g., divinylbenzene, diallyl maleate, diallyl fumarate, diallyl adipate, diallyl phthalate, allyl acrylate, allyl methacrylate, diacrylates and dimethacrylates of polyhydric alcohols, e.g., ethylene glycol dimethacrylate, etc.

In preparing the hydroxylated graft copolymers, the diene rubber polymers are usually employed in the form of freshly-prepared latices or latices which have been stored in an inert atmosphere. These latices can be prepared by any of the aqueous emulsion polymerization techniques conventionally utilized for the preparation of such latices. Generally, the monomers are emulsified in water with the aid of about 2-7%, based on the weight of the monomers, of a micelle-forming emulsifying agent and polymerized at 0-80° C. in the presence of a water-soluble free radical polymerization initiator or redox catalyst. The reaction mixture can, and usually does, also contain a chain transfer agent, e.g., a higher alkyl mercaptan such as dodecyl mercaptan.

Acid interpolymers

The acid interpolymer components of the composition of the present invention are interpolymers of (1) 2–30, and preferably 4–12, weight percent of at least one acid monomer of the formula:

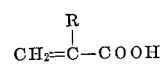

wherein R is selected from the group consisting of hydrogen, a halogen atom and alkyl groups containing 1–4 carbon atoms, (2) 2–40, and preferably 8–20, weight percent of a nitrile monomer selected from the group consisting of acrylonitrile, methacrylonitrile and mixtures thereof, and (3) the balance of at least one vinylidene monomer interpolymerizable with said acid monomer and said nitrile monomer. Examples of the monomers that may serve as the third monomer component of the acid interpolymers include mono- and di-olefins such as ethylene, propylene, butene-1, butadiene, and isoprene; vinyl halides such as vinyl chloride and vinyl bromide; vinylidene halides such as vinylidene chloride; vinylidene aromatic hydrocarbons such as styrene, vinyl naphthalene, ring alkyl-substituted styrenes, e.g., o-, m-, and p-methylstyrene, 2,4-dimethylstyrene, ring halogen-substituted styrenes, e.g., o-, m-, and p-chlorostyrene, 2,5-dichlorostyrene, talpha alkyl-substituted styrenes, e.g. alpha methylstyrene, alpha alkyl-substituted styrenes, e.g., alpha methylstyrene, of 1–18 carbon atom alkanols, e.g., methyl methacrylate, butyl methacrylate, ethyl acrylate, dodecyl acrylate, acrylamide, methacrylamide; vinyl alkyl ketones such as vinyl methyl ketone and vinyl butyl ketone; vinyl alkyl ethers such as vinyl methyl ether and vinyl butyl ether, vinyl esters of 1–18 carbon atom carboxylic acids such as vinyl formate, vinyl acetate, vinyl stearate and vinyl benzoate; etc. The preferred acid interpolymers are interpolymers of acrylic or methacrylic acid, acrylonitrile and either styrene, methyl methacrylate, or a mixture of styrene and methyl methacrylate.

Although not mandatory, it is preferred that the acid interpolymers employed in the compositions of this invention have relatively low molecular weights, e.g., less than 10,000 and more especially in a range of about 1500–5000. Acid interpolymers of this type can be prepared by the method described in Example I, Part A hereof.

Epoxy compounds

The epoxy compounds included in the compositions of the present invention may be any of the known epoxy compounds which contain two or more epoxy groups of the structure:

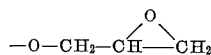

Typical examples of such epoxy compounds include polyglycidiyl esters of polybasic acids as disclosed in U.S. 2,866,767; polyglycidyl ethers of polyhydric phenols as disclosed in U.S. 2,467,171, U.S. 2,506,486, U.S. 2,640,- 037 and U.S. 2,841,595; and polyglycidyl ethers of polyhydric alcohols as disclosed in U.S. 2,538,072 and U.S. 2,581,464. The preferred epoxy compounds are the polyglycidyl ethers of dihydric phenols which have structures which may be represented by the formula:

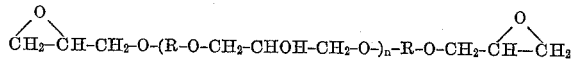

wherein $n$ is an integer of the series 0, 1, 2, 3 . . ., and R represents the divalent hydrocarbon radical of the dihydric phenol.

Other epoxy compounds which can be used in the compositions of the invention include; epoxidized drying oils such as epoxidized linsed oil, epoxidized soybean oil and other epoxidized drying oils as disclosed in U.S. 2,569,- 502; epoxidized polyolefins such as vinyl cyclohexene dioxide, dicyclopentadiene oxide, and divinyl benzene dioxide; epoxidized polyunsaturated monoesters; epoxidized polyunsaturated polyesters as disclosed in published Australian patent application 11,825/55, glycol bis-exodihydrocyclopentadienyl ethers as disclosed in U.S. 2,543,419; epoxidized novolac resins; and epoxidized liquid diene polymers such as epoxidized liquid polybutadiene as disclosed in U.S. 2,946,756. Still other epoxy compounds which can be employed are those disclosed in U.S. 2,992,- 193, U.S. 2,971,942, U.S. 2,949,438, U.S. 2,938,875, U.S. 2,936,292, U.S. 2,918,439, U.S. 2,917,469, and Belgium 588,068.

The acid interpolymers and the epoxy compounds are included in the compositions of this invention in ratios such as to provide an average of at least 0.4, preferably at least 0.6 and more especially at least 0.8, epoxy groups per carboxyl group of the acid interpolymers. Little or no advantage is attained by employing the epoxy compound in a quantity which will provide substantially more than one epoxy group per carboxyl group of the acid interpolymer.

One of the unique features of the compositions of this invention is that the acid interpolymer and the epoxy compound will undergo reaction at elevated temperatures of the order of 300° F. to thermoset the compositions without requiring the use of a catalyst. On the other hand, the acid interpolymer and the epoxy compound do not undergo reaction at any significant rate at moderate temperatures of up to about 40° C. As a result of these characteristics, the compositions of this invention can be formulated and stored for extended periods of time of up to about at least one year without thermosetting or gelling in the container in which they are stored.

Although as above noted the use of a catalyst is not required to cure the compositions of this invention at elevated temperatures, the use of such catalysts is not precluded if desired. If catalysts are employed, they normally will be of the amine type such as lutidine, collidine, pyridine, benzylamine, benzyldimethylamine, 1,8 - diamino-p-menthane, and N-substituted deriviatives thereof obtained by alkylation, such as N,N,N',N'-tetramethyl-1,8-diamino-p-menthane, and N,N'-dimethyl-1,8-diamino-p-menthane, or a polyalkylene-polyamine, including ethylenediamine, diethylenetriamine, triethylenetetramine, etc. Quaternary ammonium compounds also can be used as such catalysts in the compositions of the invention.

Utility

The compositions of the present invention find their primary utility in the formulation and manufacture of coating compositions, molding compositions, laminated articles and adhesives.

The coating compositions of the present invention comprise an organic solvent solution of the hydroxylated graft copolymer, the acid interpolymer and the epoxy compound in the ratios previously described. The organic solvent included in the coating compositions may be any of the common enamel solvents such as the hydrocarbons, alcohols, ethers, ketones, esters of any mixtures thereof such as xylene, butanol mixtures of aliphatic hydrocarbonbutanol mixtures.

In addition to the organic solvent, the hydroxylated graft copolymer, the acid interpolymer and the epoxy compound, the coating compositions of the invention also may contain pigments, extenders, fillers, delustrants, and the like. Any pigments which are not sensitive to the acid interpolymer may be employed including such pigments as titanium dioxide, copper phthalocyanine, ultramarine blue, zinc oxide, zinc sulfide, barium sulfate, calcium carbonate, zinc chromate, carbon black and the like.

Films may be layed down from the coating compositions of the invention by any conventional technique such as spraying, brushing, roll coating, dipping, etc. The wet films can be cured by heating to elevated temperatures of the order of 300 or preferably 350° F. or higher for short periods of time of the order of 10–60 minutes depending upon the curing temperature. The coating compositions of the invention have particularly utility in coating metal surfaces such as primed or unprimed steels, aluminum, chromium, nickel, brass, copper, etc. The compositions also may be used to coat other surfaces such as paper, cardboard, leather, textile fabrics, glass, porcelain and other vitreous materials, and to plastics such as polyesters, methacrylate polymers, styrene polymers and the like.

The cured films prepared from the coating compositions of the invention are characterized by having (a) good adhesion to either primed or unprimed metal substrates, (b) high hardness values, (c) good gloss, (d) good color, and (e) excellent solvent and stain resistance. The outstanding characteristic of the cured films, however, is unsurpassed resistance to alkaline detergents which is orders of magnitude superior to any organic coating heretofore known. The alkaline resistance of the films is so outstanding that they may be used to replace porcelain coated steel for certain applications such as interior coatings for washing machines and the like.

Molding compositions can be prepared by intimately blending the hydroxylated graft copolymer, the acid interpolymer and the epoxy compound with a finely-divided filler such as glass, asbestos, paper, wood flour and the like. The resulting molding compositions can be either compression or injection molded and cured by heating to temperatures above about 300° F.

Laminated articles can be prepared by impregnating a web with a mixture of the hydroxylated graft copolymer, the acid interpolymer and the epoxy compound and curing the impregnated web at an elevated temperature, preferably while maintaining the web under pressure, as shown in Example IV. The web employed may be paper or a woven textile, but preferably is a web of high melting fibers such as glass fibers, metal filaments, asbestos filaments, nylon filaments and filaments of other high melting polymers.

In preparing such laminates, the reinforcing web is impregnated with a dispersion of the hydroxylated graft copolymer, the acid interpolymer and the epoxy compound and heated at temperatures up to about 200° F. to reduce the volatiles content of the impregnated web. As the compositions of the invention do not cure at these temperatures, it is possible to reduce the volatile content to very low levels, e.g., less than 2%. In most cases, it is desirable to impregnate the web so that it will contain about 30–50 and more especially about 35–45% of resin solids. Thereafter, one or a plurality of plies of the resin impregnated web are layed up and pressed, e.g., at a pressure of 50–1,000 p.s.i., for about 15–60 minutes at an elevated temperature, e.g., 250–400° F. to bond the plies and cure the resin. As no volatile materials are formed in the curing of the resin system, it is possible to prepare high density laminates of great strength.

The compositions of the invention also can be used as adhesives to bond together diverse surfaces such as wood, paper, textiles, metals and the like. In bonding such surfaces together, the surfaces are coated with a mixture of the hydroxylated graft copolymer, the acid interpolymer and the epoxy compound and subjected to heat and pressure. The adhesive compositions at the glue line may be heated conveniently by dielectric methods.

The compositions of the invention also have other miscellaneous uses in the industrial arts. For example, the compositions may be used as a binder in the manufacture of dense high quality grinding wheels. Attractive glossy ovelays on plywood and other wooden surfaces can be obtained by coating the surface with these compositions and then curing the coatings while maintaining the assembly under pressure. The compositions also may be employed as the resin binder of the resin impregnated paper of air filters employed for automotive engines. The compositions also can be used in lieu of phenol-formaldehyde resins as the binder for sand moldings in foundry practice.

The above descriptions and particularly the examples are set forth for purposes of illustration only. Many variations and modifications thereof will be obvious to those skilled in the art and can be made without departing from the spirit and scope of the invention herein described.

What is claimed is:
1. A blend comprising
 (A) from about 1 to 250 parts by weight of a graft copolymer comprising a diene rubber substrate polymer and a hydroxylic superstrate polymer in proportion of from about 15 to 200 parts by weight of superstrate polymer per 100 parts by weight of substrate polymer; said substrate polymer being a rubbery polymer of from about 40 to 100% by weight of a conjugated diene selected from the group consisting of butadiene, isoprene, and mixtures thereof, and, correspondingly, from about 60 to zero percent by weight of at least one vinylidene monomer copolymerizable with said conjugated diene; said superstrate polymer being a polymer of (1) from about 1 to 100% by weight of an ethylenically unsaturated alcohol, (2) from zero to about 50% by weight of an ethylenically unsaturated nitrile, and (3) from zero to about 95% by weight of at least one vinylidene monomer interpolymerizable therewith;
 (B) 100 parts by weight of a substantially homogeneous interpolymer of (1) from about 2 to 30% by weight of at least one acid monomer of the formula:

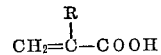

wherein R is selected from the group consisting of hydrogen, a halogen atom and alkyl groups containing 1–4 carbon atoms, (2) from about 2 to 40% by weight of a nitrile monomer selected from the group consisting of acrylonitrile, methacrylonitrile and mixtures thereof, and (3) the balance at least one vinylidene monomer interpolymerizable with said acid monomer and said nitrile monomer; and
 (C) an epoxy compound containing a plurality of epoxy groups of the structure:

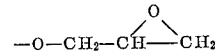

in proportion so as to provide an average of at least 0.4 epoxy group per carboxyl group of said component (B).

2. A blend as in claim 1 wherein component (B) is an interpolymer of styrene, acrylonitrile and acrylic acid.

3. A blend as in claim 2 wherein the substrate of component (A) is an interpolymer of butadiene and styrene.

4. A blend as in claim 3 wherein the superstrate of component (A) is an interpolymer of styrene, acrylonitrile and vinyl benzyl alcohol.

5. A blend as in claim 3 wherein the superstrate of component (A) is an interpolymer of styrene, acrylonitrile and phenyl allyl alcohol.

6. A blend as in claim 2 wherein the substrate of component (A) is an interpolymer of butadiene, styrene and vinyl benzyl alcohol.

7. A blend as in claim 6 wherein the superstrate of component (A) is an interpolymer of styrene, acrylonitrile and vinyl benzyl alcohol.

8. A blend as in claim 2 wherein the substrate of component (A) is an interpolymer of butadiene, styrene and phenyl allyl alcohol.

9. A blend as in claim 8 wherein the superstrate of component (A) is an interpolymer of styrene, acrylonitrile and phenyl allyl alcohol.

10. A coating and impregnating composition comprising in an organic liquid media:
 (A) from about 1 to 250 parts by weight of a graft copolymer comprising a diene rubber substrate polymer and a hydroxylic superstrate polymer in proportion of from about 15 to 200 parts by weight of superstrate polymer per 100 parts by weight of substrate polymer; said substrate polymer being a rubbery polymer of from about 40 to 100% by weight of a conjugated diene selected from the group consisting of butadiene, isoprene, and mixtures thereof, and correspondingly, from about 60 to zero percent by weight of at least one vinylidene monomer copolymerizable with said conjugated diene; said superstrate polymer being a polymer of (1) from about 1 to 100% by weight of an ethylenically unsaturated alcohol, (2) from zero to about 50% by weight of an ethylenically unsaturated nitrile, and (3) from zero to about 95% by weight of at least one vinylidene monomer interpolymerizable therewith;

(B) 100 parts by weight of a substantially homogeneous interpolymer of (1) from about 2 to 30% by weight of at least one acid monomer of the formula:

$$CH_2=\underset{R}{\underset{|}{C}}-COOH$$

wherein R is selected from the group consisting of hydrogen, a halogen atom and alkyl groups containing 1-4 carbon atoms, (2) from about 2 to 40% by weight of a nitrile monomer selected from the group consisting of acrylonitrile, methacrylonitrile and mixtures thereof, and (3) the balance at least one vinylidene monomer interpolymerizable with said acid monomer and said nitrile monomer; and (C) an epoxy compound containing a plurality of epoxy groups of the structure:

$$-O-CH_2-\overset{O}{\overset{}{\underset{}{CH}-CH_2}}$$

in proportion so as to provide an average of at least 0.4 epoxy group per carboxyl group of said component (B).

11. A coating and impregnating composition as in claim 10 wherein component (B) is an interpolymer of styrene, acrylonitrile and acrylic acid.

12. A laminate comprising a reinforcing web impregnated and bonded with a thermoset resin mixture consisting essentially of (A) from about 1 to 250 parts by weight of a graft copolymer comprising a diene rubber substrate polymer and a hydroxylic superstrate polymer in proportion of from about 15 to 200 parts by weight of superstrate polymer per 100 parts by weight of substrate polymer; said substrate polymer being a rubbery polymer of from about 40 to 100% by weight of a conjugated diene selected from the group consisting of butadiene, isoprene, and mixtures thereof, and correspondingly, from about 60 to zero percent by weight of at least one vinylidene monomer copolymerizable with said conjugated diene; said superstrate polymer being a polymer of (1) from about 1 to 100% by weight of an ethylenically unsaturated alcohol, (2) from zero to about 50% by weight of an ethylenically unsaturated nitrile, and (3) from zero to about 95% by weight of at least one vinylidene monomer interpolymerizable therewith;

(B) 100 parts by weight of a substantially homogeneous interpolymer of (1) from about 2 to 30% by weight of at least one acid monomer of the formula:

$$CH_2=\underset{R}{\underset{|}{C}}-COOH$$

wherein R is selected from the group consisting of hydrogen, a halogen atom and alkyl groups containing 1-4 carbon atoms, (2) from about 2 to 40% by weight of a nitrile monomer selected from the group consisting of acrylonitrile, methacrylonitrile and mixtures thereof, and (3) the balance at least one vinylidene monomer interpolymerizable with said acid monomer and said nitrile monomer; and (C) an epoxy compound containing a plurality of epoxy groups of the structure:

$$-O-CH_2-\overset{O}{\overset{}{\underset{}{CH}-CH_2}}$$

in proportion so as to provide an average of at least 0.4 epoxy group per carboxyl group of said component (B).

13. A laminate as in claim 12 wherein component (B) is an interpolymer of styrene, acrylonitrile and acrylic acid.

No references cited.

MURRAY TILLMAN, *Primary Examiner.*

P. LIEBERMAN, *Assistant Examiner.*